(12) United States Patent
Kozaki et al.

(10) Patent No.: US 6,240,062 B1
(45) Date of Patent: May 29, 2001

(54) FAST FOURIER TRANSFORM CALCULATING APPARATUS AND FAST FOURIER TRANSFORM CALCULATING METHOD

(75) Inventors: Yasunari Kozaki, Tokyo; Yasunari Ikeda, Kanagawa, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/067,802

(22) Filed: Apr. 29, 1998

(30) Foreign Application Priority Data

May 2, 1997 (JP) .................................................. 9-114713

(51) Int. Cl.[7] .................................................. H04J 11/00
(52) U.S. Cl. .............................................................. 370/210
(58) Field of Search .................................... 370/210, 206, 370/208; 712/220, 20, 28; 711/214, 173, 140; 708/404, 405, 408; 703/27

(56) References Cited

U.S. PATENT DOCUMENTS

| 4,689,762 | 8/1987 | Thibodeu, Jr. . | |
|---|---|---|---|
| 4,868,776 | * 9/1989 | Gray et al. | 364/726 |
| 5,042,000 | * 8/1991 | Baldwin | 364/726 |

FOREIGN PATENT DOCUMENTS 0 329 023 A2   8/1989  (EP) .

* cited by examiner

Primary Examiner—Dang Ton
(74) Attorney, Agent, or Firm—Lerner, David, Littenberg, Krumholz & Mentlik, LLP

(57) ABSTRACT

Butterfly calculations of a cardinal number of four and butterfly calculations of a cardinal number of two are performed by using the same circuitry. When butterfly calculations of a cardinal number of two are performed, predetermined lines in the circuitry are removed by using selectors. Moreover, the multiplication factors of the signal lines which join predetermined complex multiplication circuits with predetermined complex addition circuits are changed from −j to −1, from −1 to 1, from −1 to 1, and from −j to −1. As a result, a pair of butterfly calculating circuit systems (A and B) are formed. On the other hand, when calculations of a cardinal number of four are performed, all the signal lines in the circuitry are connected, and the predetermined multiplication factors of the respective paths are set. As a consequence, a single butterfly calculating circuit system having a cardinal number of four is formed.

3 Claims, 5 Drawing Sheets

FAST FOURIER TRANSFORM CALCULATING APPARATUS AND FAST FOURIER TRANSFORM CALCULATING METHOD

BACKGROUND OF THE INVENTION

1. Field of the Invention

The present invention generally relates to a signal processing apparatus and a signal processing method. More particularly, the invention relates to a signal processing apparatus and a signal processing method which are heavily used in, for example, fast FOURIER transform.

2. Description of the Related Art

Fast FOURIER transform (FFT) used in, for example, Digital Video Broadcasting-Terrestrial (DVB-T), is implemented by repeating complex calculations, which are referred to as "butterfly calculations".

In butterfly calculations, the number of data items that are calculated simultaneously varies according to the number, which is referred to as the "cardinal number". The number of repetitions of the butterfly calculations at one time in FFT is also determined by the cardinal number.

Generally, for various reasons of convenience (for example, the simplicity of the construction), a butterfly calculating circuit system having a cardinal number of four is frequently used. However, if the number of data to be subjected to FFT calculations (which is referred to as "the point number of FFT") is other than four to the power of n, FFT cannot be performed using only the butterfly calculations of a cardinal number of four.

In this case, it is necessary to add butterfly calculations of a cardinal number of two to a butterfly calculating circuit system having a cardinal number of four. Accordingly, in terms of the configuration of the circuitry, the addition of a butterfly calculating circuit system having a cardinal number of two is required.

FIGS. 5A and 5B respectively illustrate an example of a known butterfly calculating circuit system having a cardinal number of four and an example of a conventional butterfly calculating circuit system having a cardinal number of two.

The butterfly calculating circuit system having a cardinal number of four shown in FIG. 5A is formed of complex multiplication circuits 1 through 3 and complex addition circuits 4 through 7. The signal lines connecting the black dots on the left side of FIG. 5A and the complex addition circuits 4 through 7 on the right side of FIG. 5A are used to multiply input complex data by 1, −1, j, and −j and to output the multiplied data. Input data IA0 through IA3 indicate complex data. IB1 through IB3 indicate complex constant data, which is, for example, stored in a ROM, read, and supplied.

The operation of the above-described known butterfly calculating circuit system is as follows.

The complex multiplication circuits 1 through 3 multiply IA1 by IB1, IA2 by IB2, and IA3 by IB3, respectively, and output the multiplied data.

The input data IA0 is input into the complex addition circuits 4 and 5. An output of the complex multiplication circuit 1 is multiplied by 1, −j, 1, and j, and the multiplied values are respectively input into the complex addition circuits 4 through 7. An output of the complex multiplication circuit 2 is multiplied by 1, −1, 1, and −1, and the multiplied values are respectively input into the complex addition circuits 4 through 7. An output of the complex multiplication circuit 3 is multiplied by 1, j, −1, and −j, and the multiplied values are respectively input into the complex addition circuits 4 through 7.

The complex addition circuits 4 through 7 add the input data IA0 to the outputs of the complex multiplication circuits 1 through 3 multiplied by constants (1, −1, J, and −j) and output the added values as O0 through O3, respectively.

According to the above-described circuit system, butterfly calculations of a cardinal number of four can be performed.

An example of the configuration of a butterfly calculating circuit system having a cardinal number of two is described below with reference to FIG. 5B.

The butterfly calculating circuit system is formed, as shown in FIG. 5B, of a complex multiplication circuit 8 and complex addition circuits 9 and 10. IA0 and IA1 indicate input data, and IB1 represents constant data stored in, for example, a ROM.

The operation of the above example is as follows.

The input data IA0 is input into the complex addition circuits 9 and 10. The input data IA1 and the constant data IB1 are input into the complex multiplication circuit 8 in which the data IA1 and IB1 are complex-multiplied. The multiplied data is then supplied to the complex addition circuit 9, and is also supplied to the complex addition circuit 10 after being multiplied by −1.

The complex addition circuit 9 adds the input data IA0 to the output of the complex multiplication circuit 8 and outputs the resulting data as O0. Moreover, the complex addition circuit 10 adds the input data IA0 to the output of the complex multiplication circuit 8 multiplied by −1 and outputs the resulting data as O1.

According to the foregoing configuration of the circuit system, butterfly calculations of a cardinal number of two can be performed.

When the point number is other than four to the power of n, it is necessary to form FFT circuitry by using both the butterfly calculating circuit system having a cardinal number of four and the butterfly calculating circuit system having a cardinal number of two. This enlarges the resulting circuitry by an amount equal to a butterfly calculating circuit system having a cardinal number of two (which is the circuit system shown in FIG. 5B) over FFT circuitry whose point number is four to the power of n. Moreover, a butterfly calculating circuit system having a cardinal number of two is used only in part of the FFT processing, and it is thus burdensome to separately form a circuit system, which is not frequently used.

SUMMARY OF THE INVENTION

Accordingly, in view of the above background, it is an object of the present invention to eliminate the need to separately form a butterfly calculating circuit system having a cardinal number of two in FFT circuitry whose point number is other than four to the power of n, thereby effectively using resources of FFT circuitry.

According to one aspect of the present invention, there is provided a FFT calculating apparatus having input means for receiving a signal which provides an instruction to perform a butterfly calculation of a cardinal number of two or a butterfly calculation of a cardinal number of four. Selection means select predetermined data in accordance with the signal input from the input means. Switching means switch predetermined data between a real number portion and an imaginary number portion in accordance with the signal input from the input means. Sign inversion means invert a sign of the real number portion or the imaginary number portion of predetermined data in accordance with the signal input from the input means. In the above calculating apparatus, a pair of butterfly calculations of a cardinal number of two are simultaneously performed when a signal which provides an instruction to perform a butterfly calculation of a cardinal number of two is input from the input means. On the other hand, when a signal which provides an instruction to perform a butterfly calculation of a cardinal number of four is input from the input means, a single butterfly calculation having a cardinal number of four is performed.

More specifically, in the foregoing FFT calculating apparatus, upon inputting from the input means a control signal which provides an instruction to perform a butterfly calculation of a cardinal number of two or a cardinal number of four, selectors, which serve as the selection means, change the connecting states of the respective signal lines of the circuitry as required. Selectors, which serve as the switching means, switch, in accordance with the control signal, the data of the respective elements of the circuitry between the real number portion and the imaginary number portion as required. Further, sign inversion circuits, which serve as the sign inversion means, invert, in accordance with the control signal, the sign of the real number portion and the imaginary number portion of the data of the respective elements of the circuitry as required.

According to another aspect of the present invention, there is provided a FFT calculating method having an input step of inputting a signal which provides an instruction to perform a butterfly calculation of a cardinal number of two or a butterfly calculation of a cardinal number of four. In a selection step, predetermined data is selected in accordance with the signal input in the input step. In a switching step, predetermined data is switched between a real number portion and an imaginary number portion in accordance with the signal input in the input step. In a sign inversion step, the sign of the real number portion or the imaginary number portion of predetermined data is inverted in accordance with the signal input in the input step. In the above calculating method, a pair of butterfly calculations of a cardinal number of two are simultaneously performed when a signal which provides an instruction to perform a calculation of a cardinal number of two is input in the input step. In contrast, when a signal which provides an instruction to perform a calculation of a cardinal number of four is input in the input step, a single butterfly calculation of a cardinal number of four is performed.

More specifically, in the foregoing FFT calculating method, when a control signal which provides an instruction to perform a butterfly calculation of a cardinal number of four is input in the input step, selectors, which serve as the selection step, change the connecting states of the signal lines of the respective elements of the circuitry. Selectors, which are used in the switching step, switch, in accordance with the control signal, the data of the respective elements of the circuitry between the real number portion and the imaginary number portion as required. Further, sign inversion circuits, which are used in the sign inversion step, invert, in accordance with the control signal, the sign of the real number portion or the imaginary number portion of the data of the respective elements of the circuitry as required.

DESCRIPTION OF THE PREFERRED EMBODIMENT

Figure 1:
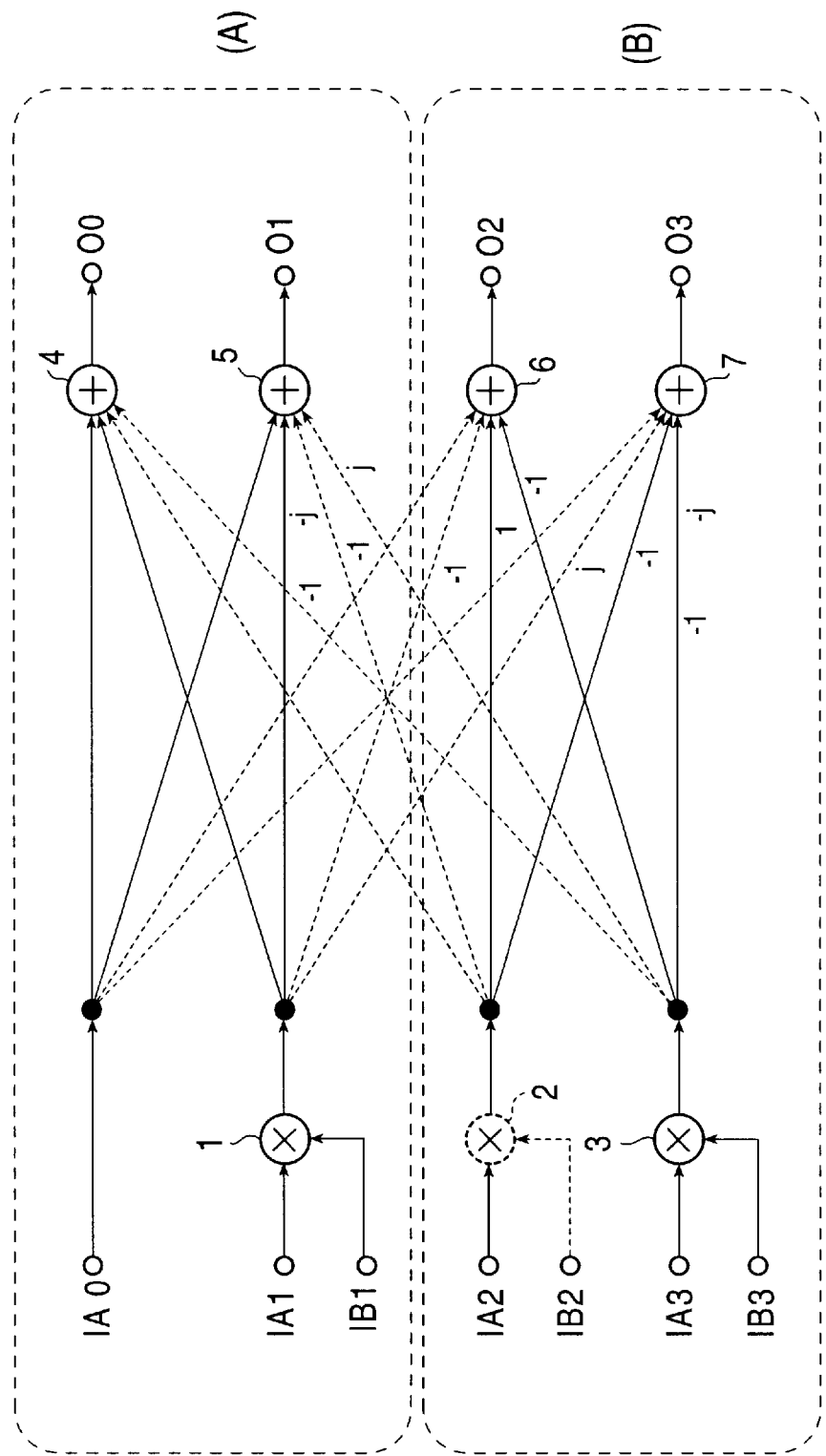
FIG. 1 illustrates the principle of FFT calculating circuitry according to the present invention.
Figure 5A:
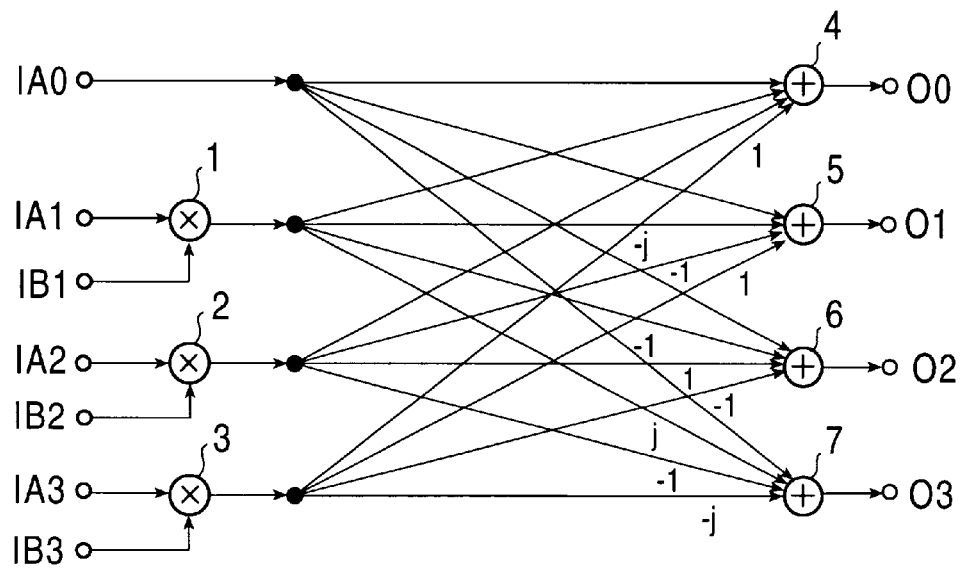
FIG. 5 is a diagram illustrating the configuration of a conventional butterfly calculating circuit system.

FIG. 1 illustrates the principle of the operation performed by FFT calculating circuitry according to the present invention. In FIG. 1, the same elements as those shown in FIG. 5A are designated with like reference numerals, and an explanation thereof is thus omitted.

In FIG. 1, in the state in which all the signal lines indicated by the broken lines are connected to each other, the circuit system acts as a single butterfly calculating circuit system having a cardinal number of four. This is understood from the fact that this circuit system is configured similarly to the butterfly calculating circuit system having a cardinal number of four shown in FIG. 5A.

In the state in which the signal lines indicated by the broken lines are not connected to each other, and if the multiplication factors (coefficients) of the respective signal lines are changed as follows, the circuit system serves as a pair of butterfly calculating circuit systems having a cardinal number of two.

1. The multiplication factor for input data transmitted through a signal line which joins the complex multiplication circuit 1 with the complex addition circuit 5 is changed from $-j$ to $-1$.

2. The multiplication factor for input data transmitted through a signal line which joins the complex multiplication circuit 3 with the complex addition circuit 6 is changed from $-1$ to $1$.

3. The multiplication factor for input data through a signal line which joins the complex multiplication circuit 2 with the complex addition circuit 7 is changed from $-1$ to $1$.

4. The multiplication factor for input data through a signal line which joins the complex multiplication circuit 3 with the complex addition circuit 7 is changed from $-j$ to $-1$.

Figure 2:
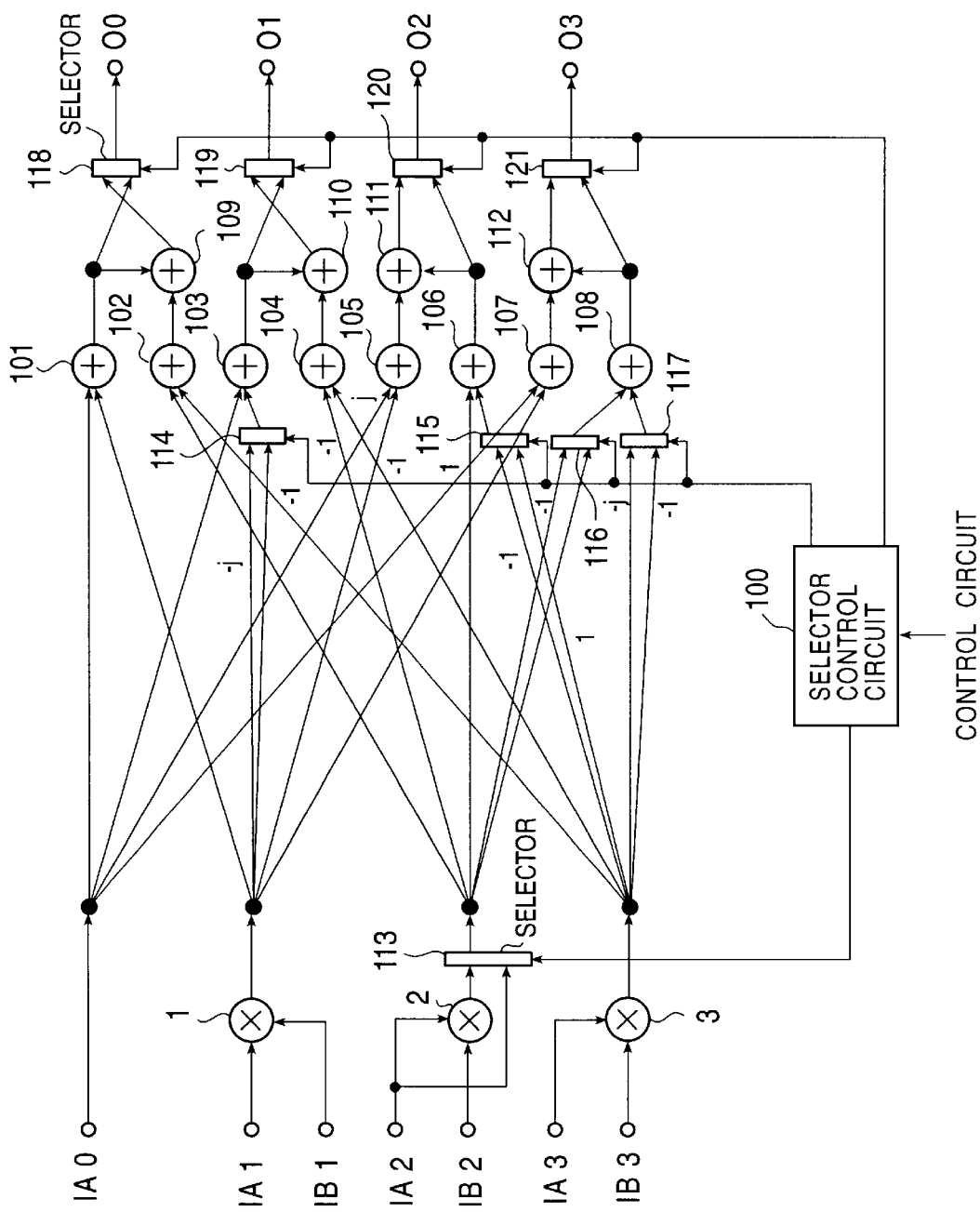
FIG. 2 is a diagram of the configuration of a butterfly calculating circuit system according to an embodiment of the present invention.

FIG. 2 is a diagram illustrating one example of a circuit system which makes it possible to remove the signal lines indicated by the broken lines of FIG. 1 and to change the multiplication factors of the respective signal lines.

The elements corresponding to those shown in FIG. 1 are designated with like reference numerals, and an explanation thereof is thus omitted. In FIG. 2, addition circuits 101 through 112 are complex addition circuits that have two inputs and produce one output.

A selector control circuit 100 causes selectors 113 through 121 to select their upper input terminals when calculations of a cardinal number of four are made. On the other hand, when calculations of a cardinal number of two are made, the selector control circuit 100 causes the selectors 113 through 121 to select their lower input terminals.

Under the control of the selector control circuit 100, the selector 113 selects an output of the complex multiplication circuit 2 when calculations of a cardinal number of four are performed. Conversely, when calculations of a cardinal number of two are performed, the selector 113 selects the constant data IA2 and outputs it.

Under the control of the selector control circuit 100, the selector 114 selects an output of the complex multiplication circuit 1 multiplied by −j and outputs it to the complex addition circuit 103 when calculations of a cardinal number of four are performed. In contrast, when calculations of a cardinal number of two are performed, the selector 114 selects an output of the complex multiplication circuit 1 multiplied by −1 and outputs it to the complex addition circuit 103.

Under the control of the selector control circuit 100, the selector 115 selects an output of the complex multiplication circuit 3 multiplied by −1 and outputs it to the complex addition circuit 106 when calculations of a cardinal number of four are made. Conversely, when calculations of a cardinal number of two are made, the selector 115 selects an output of the complex multiplication circuit 3 multiplied by 1 and outputs it to the complex addition circuit 106.

Under the control of the selector control circuit 100, the selector 116 selects an output of the selector 113 multiplied by −1 and outputs it to the complex addition circuit 108 when calculations of a cardinal number of four are performed. On the other hand, when calculations of a cardinal number of two are performed, the selector 116 selects an output of the selector 113 multiplied by 1 and outputs it to the complex addition circuit 108.

Under the control of the selector control circuit 100, the selector 117 selects an output of the complex multiplication circuit 3 multiplied by −j and outputs it to the complex addition circuit 108 when calculations of a cardinal number of four are made. Conversely, when calculations of a cardinal number of two are made, the selector 117 selects an output of the complex multiplication circuit 3 multiplied by −1 and outputs it to the complex addition circuit 108.

Under the control of the selector control circuit 100, the selector 118 selects an output of the complex addition circuit 109 and outputs it as O0 when calculations of a cardinal number of four are made. In contrast, when calculations of a cardinal number of two are made, the selector 118 selects an output of the complex addition circuit 101 and outputs it as O0.

Under the control of the selector control circuit 100, the selector 119 selects an output of the complex addition circuit 110 and outputs it as O1 when calculations of a cardinal number of four are performed. Conversely, when calculations of a cardinal number of two are performed, the selector 119 selects an output of the complex addition circuit 103 and outputs it as O1.

Under the control of the selector control circuit 100, the selector 120 selects an output of the complex addition circuit 111 and outputs it as O2 when calculations of a cardinal number of four are made. In contrast, when calculations of a cardinal number of two are made, the selector 120 selects an output of the complex addition circuit 106 and outputs it as O2.

Under the control of the selector control circuit 100, the selector 121 selects an output of the complex addition circuit 112 and outputs it as O3 when calculations of a cardinal number of four are performed. On the other hand, when calculations of a cardinal number of two are made, the selector 121 selects an output of the complex addition circuit 108 and outputs it as O3.

It is now assumed that a control signal for providing an instruction to select the cardinal number of two is input into the selector control circuit 100 so as to cause all the selectors 113 through 121 to select their lower input terminals. In this case, since the selector 118 selects an output of the complex addition circuit 101, the output O0 can be expressed by the following equation.

$$O0 = IA0 + IA1 \times IB1 \tag{1}$$

Moreover, the selector 119 selects an output of the complex addition circuit 103, and the complex addition circuit 103 adds the input data IA0 to an output of the selector 114 (IA1×IB1) multiplied by −1 and outputs the added data. Accordingly, the output O1 can be expressed by the following equation.

$$O1 = IA0 - IA1 \times IB1 \tag{2}$$

The selector 120 selects an output of the complex addition circuit 106, and the complex addition circuit 106 adds the constant data IA2 (which is the data selected by the selector 113) to an output of the selector 115 (IA3×IB3) multiplied by 1 and outputs the added data. Thus, the output O2 can be expressed by the following equation.

$$O2 = IA2 + IA3 \times IB3 \tag{3}$$

The selector 121 selects an output of the complex addition circuit 108, and the complex addition circuit 108 adds the data IA2 output from the selector 116 multiplied by 1 to the data (IA3×IB3) output from the selector 117 multiplied by −1 and outputs the added data. Accordingly, the output O3 can be expressed by the following equation.

$$O3 = IA2 - IA3 \times IB3 \tag{4}$$

Figure 5B:
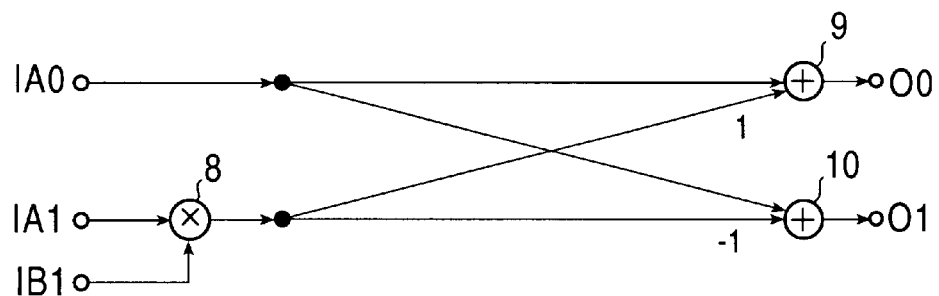

Consequently, according to the foregoing equations (1) through (4), when all the selectors 113 through 121 select their lower input terminals, the circuit system shown in FIG. 2 serves as a butterfly calculating circuit system having a cardinal number of two, such as the one illustrated in FIG. 5B.

A description is now given of the case where all the selectors 113 through 121 select their upper input terminals.

Since the selector 118 selects its upper input terminal, an output of the complex addition circuit 109 is selected. The complex addition circuit 109 adds an output of the complex addition circuit 101 to an output of the complex addition circuit 102 and outputs the added data. Consequently, the output signal O0 can be expressed by the following equation. At this time, the selector 113 selects an output of the complex multiplication circuit 2.

$$O0 = IA0 + IA1 \times IB1 + IA2 \times IB2 + IA3 \times IB3 \tag{5}$$

Since the selector 119 selects its upper input terminal, an output of the complex addition circuit 110 is selected. The complex addition circuit 110 adds an output of the complex addition circuit 103 to an output of the complex addition circuit 104 and outputs the added data. Accordingly, the output signal O1 can be expressed by the following equation. At this time, the selector 114 selects an output of the complex multiplication circuit 1 multiplied by −j.

$$O1 = IA0 - j \cdot IA1 \times IB1 - IA2 \times IB2 + j \cdot IA3 \times IB3 \tag{6}$$

Since the selector 120 selects its upper input terminal, an output of the complex addition circuit 111 is selected. The complex addition circuit 111 adds an output of the complex addition circuit 105 to an output of the complex addition circuit 106 and outputs the added data. Thus, the output signal O2 can be expressed by the following equation. At this time, the selector 115 selects an output of the complex multiplication circuit 3 multiplied by −1.

$$O2 = IA0 - IA1 \times IB2 + IA2 \times IB2 - IA3 \times IB3 \tag{7}$$

Since the selector 121 selects its upper input terminal, an output of the complex addition circuit 112 is selected. The complex addition circuit 112 adds an output of the complex addition circuit 107 to an output of the complex addition circuit 108 and outputs the added data. Accordingly, the output signal O3 can be expressed by the following equation. At this time, the selector 116 selects an output of the selector 113 (IA2×IB2) multiplied by −1, while the selector 117 selects an output of the complex multiplication circuit 3 (IA3×IB3) multiplied by −j.

$$O3=IA0+j \cdot IA1 \times IB1 - IA2 \times IB2 - j \cdot IA3 \times IB3 \qquad (8)$$

Hence, according to the foregoing equations (5) through (8), when all the selectors 113 through 121 select their upper input terminals, the circuit system shown in FIG. 2 serves as a butterfly calculating circuit system having a cardinal number of four, such as the one illustrated in FIG. 5A.

Figure 3:
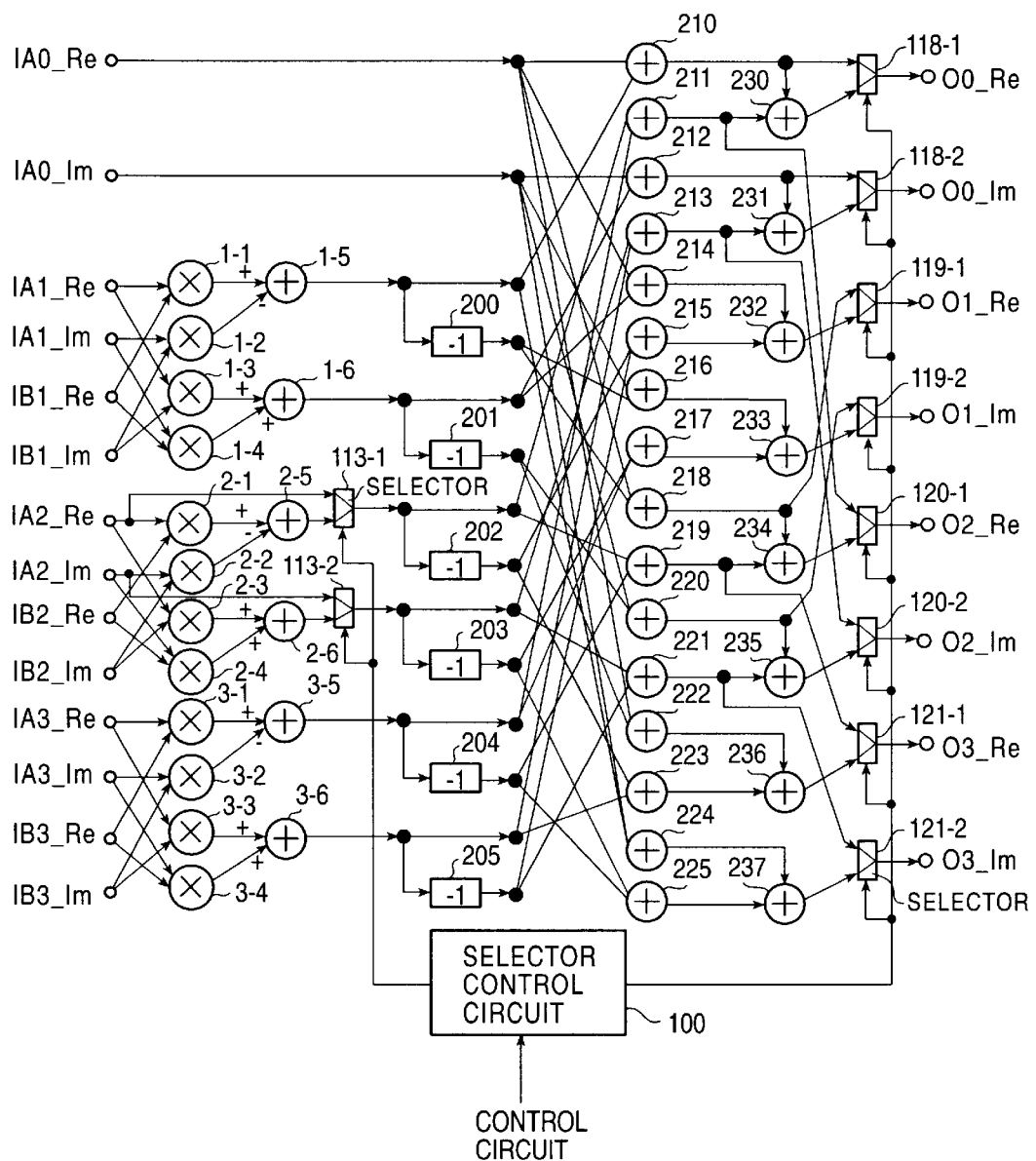
FIG. 3 is a circuit diagram illustrating the configuration of a butterfly calculating circuit system according to an embodiment of the present invention.

An embodiment of the configuration of the practical circuitry is now described with reference to FIG. 3. In FIG. 3, the elements corresponding to those of FIG. 2 are designated with like reference numerals, and an explanation thereof is thus omitted.

In FIG. 3, multiplication circuits 1-1 through 1-4 and addition circuits 1-5 and 1-6 are obtained by dividing the complex multiplication circuit 1 shown in FIG. 2 in order to make calculations on a real number portion and an imaginary number portion of the data. More specifically, the addition circuit 1-5 subtracts the product of the imaginary number portion (IA1_Im) of the data IA1 and the imaginary number portion (IB1_Im) of the data IBI calculated by the multiplication circuit 1-2 from the product of the real number portion (IA1_Re) of the data IA1 and the real number portion (IB1_Re) of the data IB1 calculated by the multiplication circuit 1-1 and outputs the resulting data as the real number portion of the data (IA1×IB1).

The addition circuit 1-6 adds the product of the real number portion (IA1_Re) of the data IA1 and the imaginary number portion (IBI_Im) of the data IB1 calculated by the multiplication circuit 1-3 to the product of the imaginary number portion (IA1_Im) of the data IA1 and the real number portion (IB1_Re) of the data IB1 calculated by the multiplication circuit 1-4 and outputs the resulting data as the imaginary number portion of the data (IA1×Ib1).

The addition circuits 2-5, 2-6, 3-5, and 3-6 perform calculations in a manner similar to the addition circuits 1-5 and 1-6, thereby outputting the real number portion of the data (IA2×IB2), the imaginary number portion of the data (IA2×IB2), the real number portion of the data (IA3×IB3), and the imaginary number portion of the data (IA3×IB3), respectively.

Selectors 113-1 and 113-2 are obtained by dividing the selector 113 shown in FIG. 2 in order to select a real number portion or an imaginary number portion of the data. More specifically, when calculations of a cardinal number of two are performed, the selector 113-1 selects and outputs the real number portion (IA2_Re) of the data IA2 which is input into its upper input terminal. On the other hand, when calculations of a cardinal number of four are performed, the selector 113-1 selects and outputs the real number portion of the data (IA2×IB2) which is input into its lower input terminal. Similarly, when calculations of a cardinal number of two are made, the selector 113-2 selects and outputs the imaginary number portion (IA2_Im) of the data IA2 which is input into its upper input terminal. Conversely, when calculations of a cardinal number of four are made, the selector 113-2 selects and outputs the imaginary number portion of the data (IA2×IB2) which is input into its lower input terminal.

Sign inversion circuits 200 through 205 invert the signs of output data of the addition circuits 1-5 and 1-6, the selectors 113-1 and 113-2, and the addition circuits 3-5 and 3-6, respectively, and output the inverted data.

Addition circuits 210 through 225 respectively add output signals at two predetermined points of the previous stage of the circuitry, and output the added data.

In the circuit diagram illustrated in FIG. 3, the selectors 114 through 117 illustrated in FIG. 2 are not shown. This is because the circuit system subsequent to the stage of the addition circuits 210 through 225 is improved, thereby making it possible to eliminate the selectors 114 through 117.

In the following description, for the brevity of explanation, the real number portion of a complex number f is indicated by Re(f), and the imaginary number portion of a complex number f is represented by Im(f).

The addition circuit 210 adds the data IA0_Re to an output (Re(IA1×IB1)) of the addition circuit 1-5 and outputs the added data.

The addition circuit 211 adds an output (IA2_Re or Re(IA2×IB2)) of the selector 113-1 to an output (Re(IA3×IB3)) of the addition circuit 3-5 and outputs the added data.

The addition circuit 212 adds the data IA0_Im to an output (Im(IA1×IB1)) of the addition circuit 1-6 and outputs the added data.

The addition circuit 213 adds an output (IA2_Im or Im(IA2×IB2)) of the selector 113-2 to an output (Im(IA3×IB3)) of the addition circuit 3-6 and outputs the added data.

The addition circuit 214 adds the data IA0_Re to an output (Im(IA1×IB1)) of the addition circuit 1-6 and outputs the added data.

The addition circuit 215 adds an output (−IA2_Re or −Re(IA1×IB1)) of the sign inversion circuit 202 to an output (−Im(IA3×IB3)) of the sign inversion circuit 205 and outputs the added data.

The addition circuit 216 adds the data IA0_Im to an output (−Re(IA1×IB1)) of the sign inversion circuit 200 and outputs the added data.

The addition circuit 217 adds an output (−IA2_Im or −Im(IA2×IB2)) of the sign inversion circuit 203 to an output (Re(IA3×IB3)) of the addition circuit 3-5 and outputs the added data.

The addition circuit 218 adds the data IA0_Re to an output (−Re(IA1×IB1)) of the sign inversion circuit 200 and outputs the added data.

The addition circuit 219 adds an output (IA2_Re or Re(IA2×IB2)) of the selector 113-1 to an output (−Re(IA3×IB3)) of the sign inversion circuit 204 and outputs the added data.

The addition circuit 220 adds the data IA0_Im to an output (−Im(IA1×IB1)) of the sign inversion circuit 201 and outputs the added data.

The addition circuit 221 adds an output (IA2_Im or Im(IA2×IB2)) of the selector 113-2 to an output (−Im(IA3×IB3)) of the sign inversion circuit 205 and outputs the added data.

The addition circuit 222 adds the data IA0_Re to an output (−Im(IA1×IB1)) of the sign inversion circuit 201 and outputs the added data.

The addition circuit 223 adds an output (−IA2_Re or −Re(IA2×IB2)) of the sign inversion circuit 202 to an output (Im(IA3×IB3)) of the addition circuit 3-6 and outputs the added data.

The addition circuit 224 adds the data IA0_Im to an output (Re(IA1×IB1)) of the addition circuit 1-5 and outputs the added data.

The addition circuit 225 adds an output (−IA2_Im or −Im(IA2×IB2)) of the sign inversion circuit 203 to an output (−Re(IA3×IB3)) of the sign inversion circuit 204 and outputs the added data.

Then, an addition circuit 230 adds an output of the addition circuit 210 to an output of the addition circuit 211 and outputs the added data to the lower terminal of a selector 118-1.

An addition circuit 231 adds an output of the addition circuit 212 to an output of the addition circuit 213 and outputs the added data to the lower terminal of a selector 118-2.

An addition circuit 232 adds an output of the addition circuit 214 to an output of the addition circuit 215 and outputs the added data to the lower terminal of a selector 119-1.

An addition circuit 233 adds an output of the addition circuit 216 to an output of the addition circuit 217 and outputs the added data to the lower terminal of a selector 119-2.

An addition circuit 234 adds an output of the addition circuit 218 to an output of the addition circuit 219 and outputs the added data to the lower terminal of a selector 120-1.

An addition circuit 235 adds an output of the addition circuit 220 to an output of the addition circuit 221 and outputs the added data to the lower terminal of a selector 120-2.

An addition circuit 236 adds an output of the addition circuit 222 to an output of the addition circuit 223 and outputs the added data to the lower terminal of a selector 121-1.

An addition circuit 237 adds an output of the addition circuit 224 to an output of the addition circuit 225 and outputs the added data to the lower terminal of a selector 121-2.

Under the control of the selector control circuit 100, the selectors 118-1 through 121-1 and the selectors 118-2 through 121-2 select their upper terminals when calculations of a cardinal number of two are performed. On the other hand, when calculations of a cardinal number of four are performed, the selectors 118-1 through 121-1 and the selectors 118-2 through 121-2 select their lower terminals.

More specifically, the selector 118-1 selects an output of the addition circuit 210 when calculations of a cardinal number of two are made. Conversely, when calculations of a cardinal number of four are made, the selector 118-1 selects an output of the addition circuit 230. The selector 118-1 then outputs an output signal O0_Re.

The selector 118-2 selects an output of the addition circuit 212 when calculations of a cardinal number of two are performed. In contrast, when calculations of a cardinal number of four are performed, the selector 118-2 selects an output of the addition circuit 231. The selector 118-2 then outputs an output signal O0_Im.

The selector 119-1 selects an output of the addition circuit 218 when calculations of a cardinal number of two are made. On the other hand, when calculations of a cardinal number of four are made, the selector 119-1 selects an output of the addition circuit 232. The selector 119-1 then outputs an output signal O1_Re.

The selector 119-2 selects an output of the addition circuit 220 when calculations of a cardinal number of two are made. Conversely, when calculations of a cardinal number of four are made, the selector 119-2 selects an output of the addition circuit 233. The selector 119-2 then outputs an output signal O1_Im.

The selector 120-1 selects an output of the addition circuit 211 when calculations of a cardinal number of two are performed. In contrast, when calculations of a cardinal number of four are performed, the selector 120-1 selects an output of the addition circuit 234. The selector 120-1 then outputs an output signal O2_Re.

The selector 120-2 selects an output of the addition circuit 213 when calculations of a cardinal number of two are made. On the other hand, when calculations of a cardinal number of four are made, the selector 120-2 selects an output of the addition circuit 235. The selector 120-2 then outputs an output signal O2_Im.

The selector 121-1 selects an output of the addition circuit 219 when calculations of a cardinal number of two are performed. Conversely, when calculations of a cardinal number of four are performed, the selector 121-1 selects an output of the addition circuit 236. The selector 121-1 then outputs an output signal O3_Re.

The selector 121-2 selects an output of the addition circuit 221 when calculations of a cardinal number of two are made. On the other hand, when calculations of a cardinal number of four are made, the selector 121-2 selects an output of the addition circuit 237. The selector 121-2 then outputs an output signal O3_Im.

According to the foregoing embodiment, upon inputting into the selector control circuit 100 a control signal for selecting calculations of a cardinal number of two, all the selectors select their upper input terminals. Thus, a pair of butterfly calculating circuit systems having a cardinal number of two are formed, as discussed above with reference to FIG. 2. On the other hand, when all the selectors are caused to select their lower input terminals, a single butterfly circulating circuit system having a cardinal number of four is formed.

According to the foregoing embodiment, butterfly calculations can be suitably switched between a cardinal number of four and a cardinal number of two by using the same circuitry. Consequently, even if FFT calculations whose point number is other than four to the power of n are performed, FFT calculating circuitry can be formed without needing to separately form a butterfly calculating circuit system having a cardinal number of two, thereby making it possible to contain the scale of the circuitry.

Figure 4:
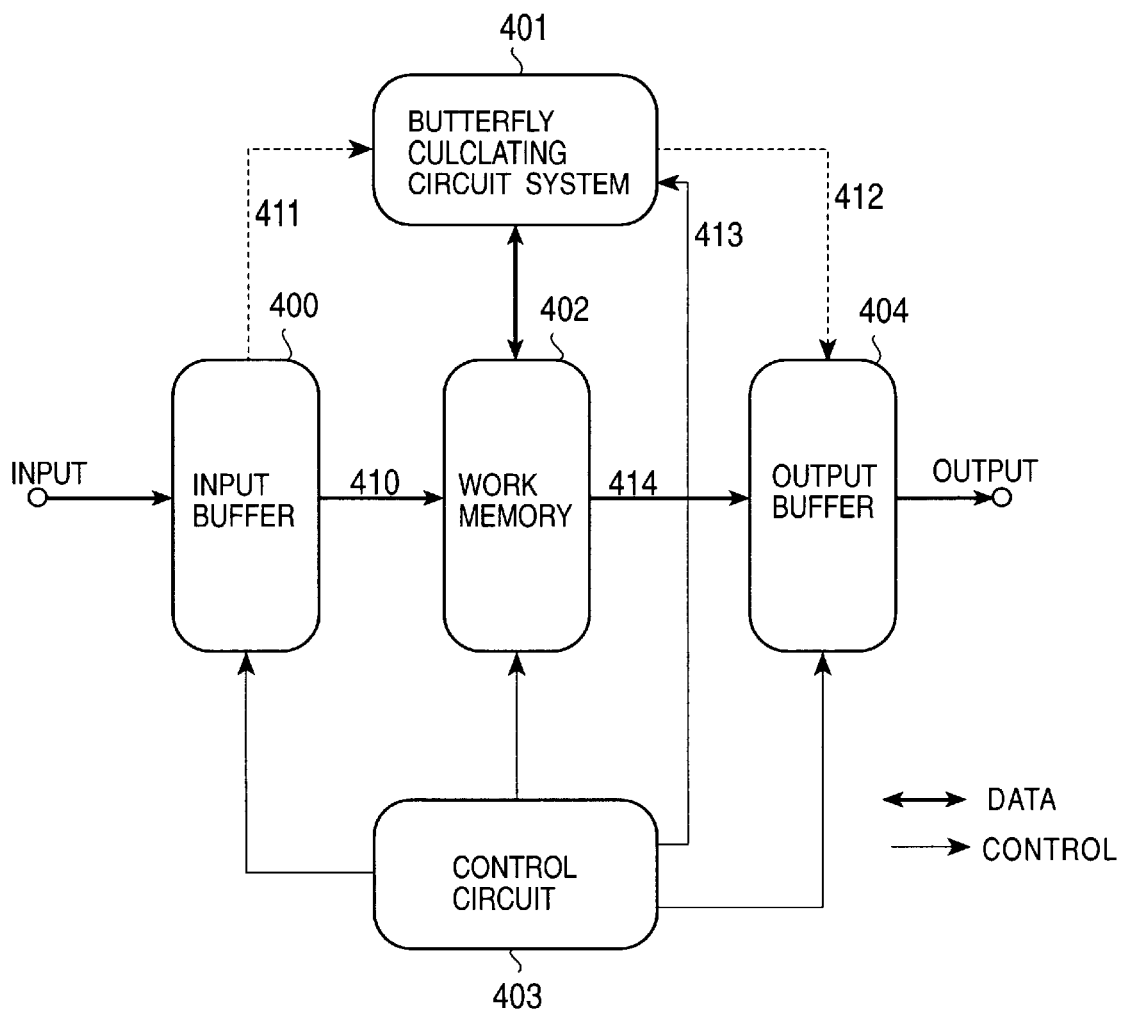
FIG. 4 is a block diagram illustrating the configuration of a FFT calculating apparatus formed by the present invention.

FIG. 4 is a block diagram illustrating an example of the configuration of a FFT calculating apparatus formed by the foregoing embodiment.

In FIG. 4, an input buffer 400 temporarily stores input data. A butterfly calculating circuit system 401 has a built-in circuit shown in FIG. 3, and performs calculations of a cardinal number of two or four under the control of a control circuit 403. A work memory 402 temporarily stores data which is being used for calculations performed by the butterfly calculating circuit system 401.

The control circuit 403 controls the respective elements of the apparatus and also supplies a control signal to the butterfly calculating circuit system 401 to switch butterfly calculations between a cardinal number of two and a cardinal number of four. An output buffer 404 temporarily stores the calculated data and then outputs it in synchronization with the data rate of an external device.

The operation of the above-described embodiment is as follows.

Data to be calculated is temporarily stored in the input buffer 400 and is read in accordance with the progress of calculations as required. Data read from the input buffer 400 is stored in the work memory 402 via a signal line 410. The butterfly calculating circuit 401 reads data stored in the work memory 402 and performs predetermined calculations as necessary. The butterfly calculating circuit 401 also writes the calculated data into the work memory 402.

According to the calculation timing, however, data read from the input buffer 400 may be directly input into the butterfly calculating circuit system 401 via a signal line 411 and then calculated, and the calculated data may be directly output to the output buffer 404 via a signal line 412.

The butterfly calculating circuit system 401 performs a predetermined number of butterfly calculations while transmitting and receiving data to/from the work memory 402. The control circuit 403 not only controls the data transfer timing and the addresses of the elements to be transferred (or the elements which have transferred data), but also transmits a control signal to the butterfly calculating circuit system 401 via a signal line 413 so as to change calculations between a cardinal number of four and a cardinal number of two.

Upon completing butterfly calculations on all the data items, the whole data is transferred to the output buffer 404 from the work memory 402 via a signal line 414, thereby outputting the calculated data.

The timing of switching calculations between a cardinal number of four and a cardinal number of two is determined by the method used in the circuit system. Normally, however, calculations are switched after the first stage or before the final stage, since calculations of a cardinal number of two are usually performed in the first and the final stages. The term "stage" means a process of performing a single butterfly calculation on all the data items in FFT calculations.

According to the foregoing embodiment, calculations of the butterfly calculating circuit system 401 are switched between a cardinal number of four and a cardinal number of two in accordance with a predetermined calculation procedure. As a consequence, circuitry resources can be effectively used.

As is seen from the foregoing description, the FFT calculating apparatus and the FFT calculating method of the present invention offer the following advantages. A signal which provides an instruction to perform a butterfly calculation of a cardinal number of four or a cardinal number of two is input. Predetermined data is selected in accordance with the input signal. The predetermined data is then switched between the real number portion and the imaginary number portion in accordance with the input signal. The sign of the real number portion or the imaginary number portion of the predetermined data is inverted in accordance with the input signal. If the input signal indicates calculations of a cardinal number of two, a pair of butterfly calculations of a cardinal number of two are simultaneously performed. Conversely, if the input signal represents calculations of a cardinal number of four, a single butterfly calculation of a cardinal number of four is performed. Thus, it is possible to perform butterfly calculations of a cardinal number of two and a cardinal number of four by the same FFT calculating apparatus. Hence, the circuitry resources can be effectively used.

What is claimed is:

1. A fast FOURIER transform calculating apparatus for performing a butterfly calculation on input data, said fast FOURIER transform calculating apparatus comprising:
   input means for receiving an instruction signal which provides an instruction to perform a butterfly calculation of a cardinal number of two or a butterfly calculation of a cardinal number of four;
   a selector operable to select predetermined data in accordance with the instruction signal;
   a switch operable to switch the predetermined data between a real number portion and an imaginary number portion in accordance with the instruction signal; and
   a sign inversion device operable to invert a sign of the real number portion or the imaginary number portion of the predetermined data in accordance with the instruction signal,
   wherein a pair of butterfly calculations of a cardinal number of two are simultaneously performed in a case where the instruction signal provides an instruction to perform a butterfly calculation of a cardinal number of two, and a single butterfly calculation having a cardinal number of four is performed in a case where the instruction signal provides an instruction to perform a butterfly calculation of a cardinal number of four.

2. A fast FOURIER transform calculating apparatus according to claim 1, further comprising a signal generator operable to generate, in accordance with the number of input data, a signal which provides an instruction to perform a butterfly calculation of a cardinal number of two or a butterfly calculation of a cardinal number of four.

3. A fast FOURIER transform calculating method for performing a butterfly calculation on input data, said method comprising:
   inputting an instruction signal which provides an instruction to perform a butterfly calculation of a cardinal number of two or a butterfly calculation of a cardinal number of four;
   selecting predetermined data in accordance with the instruction signal;
   switching the predetermined data between a real number portion and an imaginary number portion in accordance with the instruction signal; and
   inverting a sign of the real number portion or the imaginary number portion of the predetermined data in accordance with the instruction signal,
   wherein a pair of butterfly calculations of a cardinal number of two are simultaneously performed in a case where the instruction signal provides an instruction to perform a calculation of a cardinal number of two, and a single butterfly calculation of a cardinal number of four is performed in a case where the instruction signal provides an instruction to perform a calculation of a cardinal number of four.

* * * * *

UNITED STATES PATENT AND TRADEMARK OFFICE
CERTIFICATE OF CORRECTION

PATENT NO. : 6,240,062 B1
DATED : May 29, 2001
INVENTOR(S) : Kozaki et al.

It is certified that error appears in the above-identified patent and that said Letters Patent is hereby corrected as shown below:

Column 2,
Line 5, "(1, -1, J, and –j)" should read -- (1, -1, j, and –j) --.

Column 7,
Line 40, "(IA1xIb1)" should read -- (IAxIB1) --.
Line 53, "(IA2 Re)" should read -- (IA2_Re) --.

Column 8,
Line 25, "(IA2 Im or" should read -- (IA2_Im or --.
Line 66, "(-IA2 Im or" should read -- (IA2_Im or --.

Column 9,
Line 53, "O0 Im." should read -- O0_Im. --.

Signed and Sealed this

Eighth Day of January, 2002

JAMES E. ROGAN
*Director of the United States Patent and Trademark Office*

*Attest:*

*Attesting Officer*